United States Patent
Vöge

(10) Patent No.: US 10,758,986 B2
(45) Date of Patent: Sep. 1, 2020

(54) CUTTING INSERT AND TOOL FOR MACHINING

(71) Applicant: Hartmetall-Werkzeugfabrik Paul Horn GmbH, Tuebingen (DE)

(72) Inventor: Rüdiger Vöge, Rottenburg (DE)

(73) Assignee: Hartmetall-Werkzeugfabrik Paul Horn GmbH, Tubingen (DE)

( * ) Notice: Subject to any disclaimer, the term of this patent is extended or adjusted under 35 U.S.C. 154(b) by 59 days.

(21) Appl. No.: 16/196,208

(22) Filed: Nov. 20, 2018

(65) Prior Publication Data
US 2019/0084053 A1 Mar. 21, 2019

Related U.S. Application Data

(63) Continuation of application No. PCT/EP2017/061951, filed on May 18, 2017.

(30) Foreign Application Priority Data

May 25, 2016 (DE) .................. 10 2016 109 670

(51) Int. Cl.
| | |
|---|---|
| B23B 27/04 | (2006.01) |
| B23B 29/04 | (2006.01) |
| B23B 27/14 | (2006.01) |

(52) U.S. Cl.
CPC ............ B23B 29/043 (2013.01); B23B 27/04 (2013.01); B23B 27/145 (2013.01); B23B 29/04 (2013.01);
(Continued)

(58) Field of Classification Search
CPC .......... B23B 2200/369; B23B 2205/12; B23B 27/04; B23B 27/145; B23B 29/043;
(Continued)

(56) References Cited

U.S. PATENT DOCUMENTS

| | | | | |
|---|---|---|---|---|
| 53,496 A | * | 3/1866 | Smith | ............................ 407/31 |
| 349,475 A | * | 9/1886 | Barclay | ................. B23B 27/083 |
| | | | | 407/64 |

(Continued)

FOREIGN PATENT DOCUMENTS

| | | |
|---|---|---|
| CN | 1130885 A | 9/1996 |
| CN | 1633343 A | 6/2005 |

(Continued)

OTHER PUBLICATIONS

International Search Report for International Application No. PCT/EP2017/061951, dated Aug. 11, 2017.
(Continued)

Primary Examiner — Sara Addisu
(74) Attorney, Agent, or Firm — Jason H. Vick; Sheridan Ross, PC

(57) ABSTRACT

A cutting insert for a tool for machining a workpiece, comprising a first side, an opposite second side and a bore running along a bore axis. The bore penetrates the cutting insert and extends from the first side to the second side. The cutting insert comprises at least three cutting heads arranged distributed on a periphery of the cutting insert, wherein each of the at least three cutting heads comprises a cutting edge, which runs transversely to the first side and the second side and extends between the first side and the second side. The at least three cutting heads comprise a first cutting head, a second cutting head, which in a peripheral direction directly follows the first cutting head, and a third cutting head, which in the peripheral direction directly follows the second cutting head. The cutting insert has a first support surface arranged on the first side, which first support surface runs orthogonal to the bore axis and at least partially surrounds the bore. The cutting insert is rotationally symmetric to the bore axis and mirror-symmetric to a center plane which runs perpendicular to the bore axis and divides the cutting insert
(Continued)

into two equally sized halves. Viewed in a top view along the bore axis, an imaginary straight connecting line between the cutting edge of the first cutting head and the cutting edge of the third cutting head intersects neither the bore nor the first support surface.

19 Claims, 4 Drawing Sheets

(52) U.S. Cl.
CPC ... *B23B 2200/048* (2013.01); *B23B 2200/369* (2013.01); *B23B 2205/12* (2013.01); *B23B 2220/123* (2013.01)

(58) Field of Classification Search
CPC ........ B23B 2200/048; B23B 2220/123; B23B 2220/0404; Y10T 407/23
See application file for complete search history.

(56) References Cited

U.S. PATENT DOCUMENTS

| | | | |
|---|---|---|---|
| 2,476,749 A * | 7/1949 | Marsh | B23C 5/18 407/60 |
| 3,730,038 A * | 5/1973 | Farb | B23D 61/025 83/837 |
| 4,039,011 A * | 8/1977 | Sword | B23D 61/04 144/218 |
| 4,169,690 A * | 10/1979 | Kendra | B23B 27/065 407/103 |
| 4,363,576 A * | 12/1982 | Zweekly | B23B 27/045 407/109 |
| 4,770,219 A * | 9/1988 | Blackwell, Jr. | B23C 5/2243 144/218 |
| 5,765,972 A | 6/1998 | Ericksson et al. | |
| 6,527,485 B1 | 3/2003 | Little | |
| 6,942,434 B2 | 9/2005 | Friedman et al. | |
| 7,597,508 B2 | 10/2009 | Hecht | |
| 7,645,100 B2 | 1/2010 | Andersson et al. | |
| 7,896,586 B2 | 3/2011 | Morgulis | |
| 8,317,434 B2 * | 11/2012 | Oettle | B23D 61/06 407/110 |
| 8,408,847 B2 | 4/2013 | Rysavy | |
| 8,529,165 B2 * | 9/2013 | Chistyakov | B23B 27/04 407/107 |
| 8,678,718 B2 | 3/2014 | Hecht | |
| 8,714,886 B2 | 5/2014 | Hecht et al. | |
| 8,734,064 B2 * | 5/2014 | Koontz | B23B 27/04 407/103 |
| 9,174,279 B2 | 11/2015 | Hecht | |
| 9,352,402 B2 * | 5/2016 | Luik | B23C 5/2295 |
| 9,919,366 B2 * | 3/2018 | Orlov | B23C 5/109 |
| 1,000,513 A1 | 6/2018 | Hecht | |
| 2003/0156910 A1 * | 8/2003 | Friedman | B23B 27/08 407/117 |
| 2007/0231089 A1 * | 10/2007 | Hecht | B23B 27/04 407/113 |
| 2009/0162154 A1 * | 6/2009 | Jonsson | B23B 27/045 407/114 |
| 2012/0039676 A1 * | 2/2012 | Marshansky | B23C 5/1054 407/48 |
| 2012/0099935 A1 * | 4/2012 | Hecht | B23B 27/1614 407/100 |
| 2013/0156516 A1 * | 6/2013 | Hecht | B23B 27/1622 407/103 |
| 2013/0272807 A1 | 10/2013 | Luik et al. | |
| 2013/0309028 A1 * | 11/2013 | Chistyakov | B23B 27/045 407/114 |
| 2014/0050542 A1 * | 2/2014 | Zeeb | B23B 27/08 407/103 |
| 2014/0186130 A1 * | 7/2014 | Hecht | B23B 27/145 407/100 |
| 2015/0000434 A1 * | 1/2015 | Hecht | B23B 29/043 74/55 |
| 2015/0290717 A1 * | 10/2015 | Hecht | B23B 27/1662 407/103 |
| 2018/0001390 A1 * | 1/2018 | Ando | B23B 27/04 |
| 2019/0070669 A1 * | 3/2019 | Amor | B23B 27/1622 |

FOREIGN PATENT DOCUMENTS

| | | |
|---|---|---|
| CN | 101204738 A | 6/2008 |
| CN | 101415512 A | 4/2009 |
| CN | 101466490 A | 6/2009 |
| CN | 101489706 A | 7/2009 |
| CN | 101823162 A | 9/2010 |
| CN | 102476198 A | 5/2012 |
| CN | 202263949 U | 6/2012 |
| CN | 202555851 U | 11/2012 |
| CN | 103153506 A | 6/2013 |
| CN | 103357907 A | 10/2013 |
| CN | 104039486 A | 9/2014 |
| CN | 104364036 A | 2/2015 |
| CN | 104884201 A | 9/2015 |
| DE | 3685746 T2 | 1/1993 |
| DE | 102010054392 A1 | 6/2012 |
| DE | 112013006340 T5 | 9/2015 |
| EP | 0091408 A2 | 10/1983 |
| EP | 0232692 B1 | 6/1992 |
| EP | 0934135 B1 | 8/2002 |
| JP | H 05-20803 U | 3/1993 |
| JP | 2014-124719 A | 7/2014 |
| JP | 2016-501738 A | 1/2016 |
| RU | 2443509 C1 | 2/2002 |
| SU | 764855 A1 | 9/1980 |
| SU | 1540949 A1 | 2/1990 |
| WO | WO 2014/106836 | 7/2014 |

OTHER PUBLICATIONS

Written Opinion for International Application No. PCT/EP2017/061951, dated Aug. 11, 2017.
Office Action (Including Translation) for corresponding Russian Patent Application No. 2018141201/02(068621), dated Oct. 3, 2019.
International Preliminary Report Patentability for International Application No. PCT/EP2017/061951, dated Dec. 6, 2018.
Office Action for Chinese Patent Application No. 201780032432.2, dated Nov. 18, 2019.
Notification of Reasons for Rejection (Including translation) for Japanese Patent Application No. 2018-562050, dated Dec. 10, 2019.

* cited by examiner

CUTTING INSERT AND TOOL FOR MACHINING

CROSS REFERENCE TO RELATED APPLICATIONS

This application is a continuation of international patent application PCT/EP2017/061951, filed on May 18, 2017 designating the U.S., which international patent application has been published in German language and claims priority from German patent application DE 10 2016 109 670.9, filed on May 25, 2016. The entire contents of these priority applications are incorporated herein by reference.

BACKGROUND OF THE INVENTION

This disclosure relates to a cutting insert for a tool for machining a workpiece. The cutting insert according to this disclosure is preferably an indexable cutting insert, which may be employed in a turning tool, which is preferably used in a turning tool for recess turning. This disclosure further relates to a tool comprising a cutting insert of this kind, a holder and a fastening element for fastening the cutting insert to the holder.

An exemplary cutting insert for a turning tool, which may be used for recess turning, is known from U.S. Pat. No. 6,942,434 B2.

Indexable cutting inserts of this type mostly possess three or more cutting heads, which are arranged distributed on the periphery of the cutting insert. As soon as a cutting head, or the cutting edge arranged thereon, is worn, the cutting insert can be detached from the tool holder and fixed in a new position on the tool holder, so that one of the other, hitherto unworn cutting heads is then employed. The indexable cutting inserts can therefore be used several times over in accordance with the number of their cutting heads.

In particular in recess turning, tools having a relatively large plunge depth are particularly desired. The more cutting heads are arranged distributed on the periphery of the cutting insert, the more difficult it proves, however, from a design viewpoint, to be able to ensure sufficiently large plunge depths with tools of this type. A further important factor which matters in tools for recess turning, as well as in tools for other types of turning, is the design of an as stable as possible insert seat in the tool holder.

In the tool known from U.S. Pat. No. 6,942,434 B2, the last-named factor is relatively well achieved from a technical viewpoint, since the cutting insert is in this tool fixed very stably in the tool holder and the forces acting on the cutting insert can be effectively diverted into the tool holder. In this tool, the plunge depth to be realized is, however, comparatively small.

U.S. Pat. No. 9,174,279 B2 discloses a further tool, which is advantageous as regards plunge depth compared to the tool known from U.S. Pat. No. 6,942,434 B2. For the clamping of the cutting insert is here used, however, in addition to the customarily used clamping screw, a further component, which as a type of halfmoon-shaped clamping element engages in the bore provided in the cutting insert. Such additional clamping elements are not only difficult to produce, but also increase the production costs overall.

SUMMARY OF THE INVENTION

It is an object to provide a cutting insert which, in particular, is suitable for a tool for recess turning and, in comparison with the cutting inserts known from the prior art, enables a greater plunge depth, is easier to produce and can be fixed in a mechanically stable manner in the tool holder.

According to a first aspect, a cutting insert for a tool for machining a workpiece is presented, wherein the cutting insert comprises a first side, an opposite second side and a bore running along a bore axis. The bore penetrates the cutting insert and extends from the first side to the second side. The cutting insert further comprises at least three cutting heads arranged distributed on a periphery of the cutting insert, wherein each of the at least three cutting heads comprises a cutting edge, which runs transversely to the first side and the second side and extends between the first side and the second side. The at least three cutting heads comprise a first cutting head, a second cutting head, which in a peripheral direction directly follows the first cutting head, and a third cutting head, which in the peripheral direction directly follows the second cutting head. The cutting insert has a first support surface arranged on the first side, which first support surface runs orthogonal to the bore axis and at least partially surrounds the bore, wherein the cutting insert is rotationally symmetric to the bore axis and mirror-symmetric to a center plane which runs perpendicular to the bore axis and divides the cutting insert into two equally sized halves. Viewed in a top view along the bore axis, an imaginary straight connecting line between the cutting edge of the first cutting head and the cutting edge of the third cutting head intersects neither the bore nor the first support surface.

According to a second aspect, a tool for machining a workpiece is presented, wherein the tool comprises:

a cutting insert comprising a first side, an opposite second side and a bore running along a bore axis, which bore penetrates the cutting insert and extends from the first side to the second side, and comprising at least three cutting heads arranged distributed on a periphery of the cutting insert, wherein each of the at least three cutting heads comprises a cutting edge, which runs transversely to the first side and the second side and extends between the first side and the second side, wherein the at least three cutting heads comprise a first cutting head, a second cutting head, which in a peripheral direction directly follows the first cutting head, and a third cutting head, which in the peripheral direction directly follows the second cutting head, and wherein the cutting insert has a first support surface arranged on the first side, which first support surface runs orthogonal to the bore axis and at least partially surrounds the bore, wherein the cutting insert is rotationally symmetric to the bore axis and mirror-symmetric to a center plane which runs perpendicular to the bore axis and divides the cutting insert into two equally sized halves, wherein, viewed in a top view along the bore axis, an imaginary straight connecting line between the cutting edge of the first cutting head and the cutting edge of the third cutting head intersects neither the bore nor the first support surface;

a holder; and a fastening element which fastens the cutting insert to the holder.

In the present disclosure, by the term "transversely" is preferably, but not necessarily understood "orthogonal(ly)" or "perpendicular(ly)". Angles unequal to 0°, i.e. not necessarily 90°, are likewise understood to be included under the term "transversely".

The fact that the above-stated imaginary connecting line intersects neither the bore nor the first support surface offers the advantage that the possible attainable plunge depth of the cutting insert is maximized. In this way, it is possible with the cutting insert to recess in a collision-free manner, up to the rim of the first support surface, into the workpiece to be machined.

The maximum possible plunge depth corresponds to the distance between the cutting edge of the respectively in-use cutting head (according to terminology used in the present document, this is the second cutting head) and the outer rim of the first support surface.

In order to ensure the absence of collisions up to the maximum possible plunge depth, it is preferred that the cutting edges of the at least three cutting heads run parallel to the bore axis, and that the cutting edges are the, measured parallel to the bore axis, respectively widest points of the cutting insert in a cutting edge zone containing all regions of the cutting insert which are arranged radially further out than the first support surface, or have a greater distance from the bore axis than the outer rim of the first support surface.

As a result of the first support surface, which runs perpendicular to the bore axis, a mechanically stable insert seat can be guaranteed. Moreover, this type of support surface can be produced in a relatively simple and cost-effective manner.

According to a refinement, the bore has contiguous to the first side a countersink, wherein the first support surface directly adjoins the countersink.

The fact that the first support surface directly adjoins the countersink of the bore has the advantage that the countersink and the other parts of the cutting insert are placed under least possible load. The further the first support surface were to be shifted radially outward, the greater would otherwise be the load, and hence also the risk of fracture of the cutting insert.

According to a further refinement, the first support surface is of annular design.

The annular design of the first support surface has the advantage that optimal use is hereby made of the required space. On the one hand, this enables a largest possible first support surface, which has a positive effect on the stability of the insert seat. On the other hand, an annular first support surface of this kind reduces as minimally as possible the plunge depth which can be realized with the herein presented cutting insert.

According to a further refinement, the imaginary straight connecting line between the cutting edge of the first cutting head and the cutting edge of the third cutting head, viewed in the top view along the bore axis, tangentially touches the first support surface.

A tangential touching of the first support surface should here thus not be construed as an intersection of the first support surface. If the imaginary connecting line tangentially touches the first support surface, then optimal use is made of the space on the cutting insert, since both the plunge depth and the size of the first support surface, and hence also the stability of the insert seat, are maximized.

According to a further refinement, the first support surface is surrounded by a recess which extends on the first side between the first support surface and the cutting heads.

This recess surrounds the first support surface preferably fully. It preferably likewise has, similarly to the first support surface, a substantially annular form. The recess is preferably made in the cutting insert already during pressing or sintering thereof. It reduces the amount of grinding, as well as the amount of material used during the production of the cutting insert. Furthermore, as a result of this recess, the first support surface is freed and hence clearly defined.

According to a further refinement, the cutting insert has six cutting heads in total. It can thus be used six times before having to be discarded.

According to a further refinement, the cutting insert further has a second support surface arranged on the second side, which second support surface runs orthogonal to the bore axis, at least partially surrounds the bore and lies opposite the first support surface.

The cutting insert is thus preferably not only rotationally symmetric to the bore axis, but also mirror-symmetric to a center plane which runs perpendicular to the bore axis and divides the cutting insert into two equally sized halves. The cutting insert can thus be used both as a "right" and as a "left" cutting insert and can therefore be inserted into different tool holders.

The refinements stated above with respect to the first support surface apply equivalently to the second support surface: The bore hence preferably has not only contiguous to the first side, but also contiguous to the second side, a countersink, wherein the second support surface directly adjoins the countersink. Also the second support surface is preferably of annular design. Viewed in the top view along the bore axis, there also exists on the second side an imaginary straight connecting line between the cutting edge of the first cutting head and the cutting edge of the third cutting head, which connecting line intersects neither the bore nor the second support surface, but touches the second support surface preferably tangentially. Also the second support surface is preferably surrounded by a recess (here referred to as the "second recess"), which extends on the second side between the second support surface and the cutting heads.

According to a further refinement, the first support surface has a first distance d from the second support surface and the cutting edges have respectively a width b measured parallel to the bore axis, wherein: $0.9\ b \leq d \leq 1.1\ b$.

In other words, the width of the cutting edges is thus roughly equal in size to the distance between the two, mutually opposite support surfaces of the cutting insert. The difference between these two dimensions is preferably maximally ±10%. In a further refinement, the two dimensions b and d are equally large.

As already mentioned in the introduction, this disclosure relates not only to the cutting insert itself, but also to a tool for machining a workpiece, comprising a cutting insert of this kind, a holder, and a fastening element for fastening the cutting insert to the holder. The fastening element is preferably in the form of a screw, wherein the holder has a thread, which runs along a thread axis and in which the screw engages, and wherein the holder has a first holder support surface, which runs transversely to the thread axis and on which, in the mounted state of the tool, the first support surface of the cutting insert rests.

It is obvious that, depending on the shape and symmetry of the holder, also the above-stated, second support surface of the cutting insert can rest on the holder support surface of the holder. The cutting insert would in this case be inserted exactly the other way round in the holder, thus turned through 180° about an axis running orthogonal to the bore axis.

According to a refinement of the tool, the holder has two mutually spaced holder contact surfaces, against which the cutting insert, in the mounted state of the tool, bears peripherally with two corresponding cutting insert contact surfaces, which are arranged between respectively two adjacent cutting heads of the cutting insert, wherein the holder contact surfaces run parallel to the thread axis, and wherein the cutting insert contact surfaces run parallel to the bore axis. The holder contact surfaces are preferably convexly shaped. The cutting insert contact surfaces are preferably concavely shaped.

According to a further refinement, a radius of curvature of the holder contact surfaces is smaller than a radius of curvature of the cutting insert contact surfaces. The holder contact surfaces are thus more strongly curved than the cutting insert contact surfaces. As a result, an exactly defined insert seat is formed, wherein the cutting insert bears approximately linearly against the holder on the corresponding contact surfaces.

According to a further refinement, a distance between the holder contact surfaces and the thread axis of the holder is less than a distance between the cutting insert contact surfaces and the bore axis of the cutting insert.

This offset between bore axis and thread axis has the advantage that the cutting insert, as the screw is tightened, is automatically pressed with the cutting insert contact surfaces against the corresponding holder contact surfaces. This improves the stability of the insert seat.

According to a further refinement, the holder has on its front-face end a front edge, wherein, in the mounted state of the tool, the cutting edge of only one of the cutting heads protrudes beyond this front edge relative to the holder and the cutting edges of the other cutting heads are arranged in the holder.

It is hereby ensured that the other cutting edges, which are not in use, cannot themselves at maximum plunge depth be damaged, since they are protected by the tool holder.

It is obvious that the above-stated and the hereinafter yet to be described features are usable not only in the respectively stated combination, but also in other combinations or in isolation, without departing from the spirit and scope of the present disclosure.

DESCRIPTION OF PREFERRED EMBODIMENTS

Figure 1:
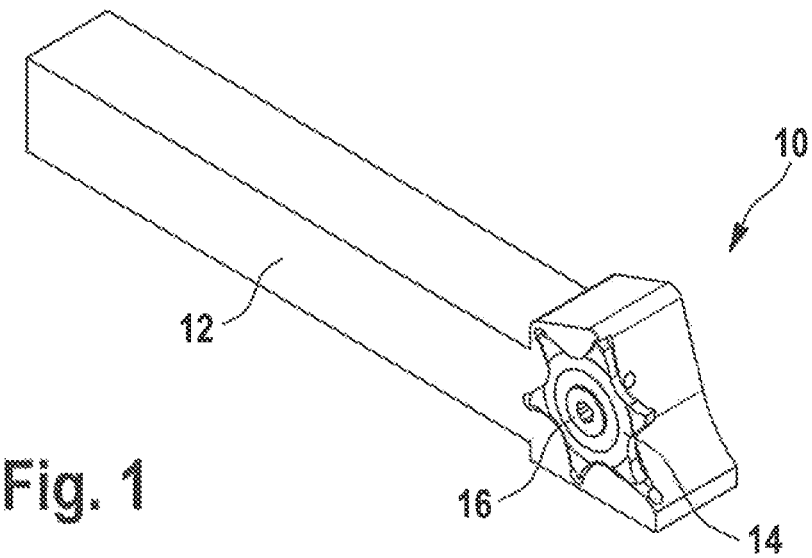
FIG. 1 shows a perspective view of an embodiment of the herein presented tool.
Figure 2:
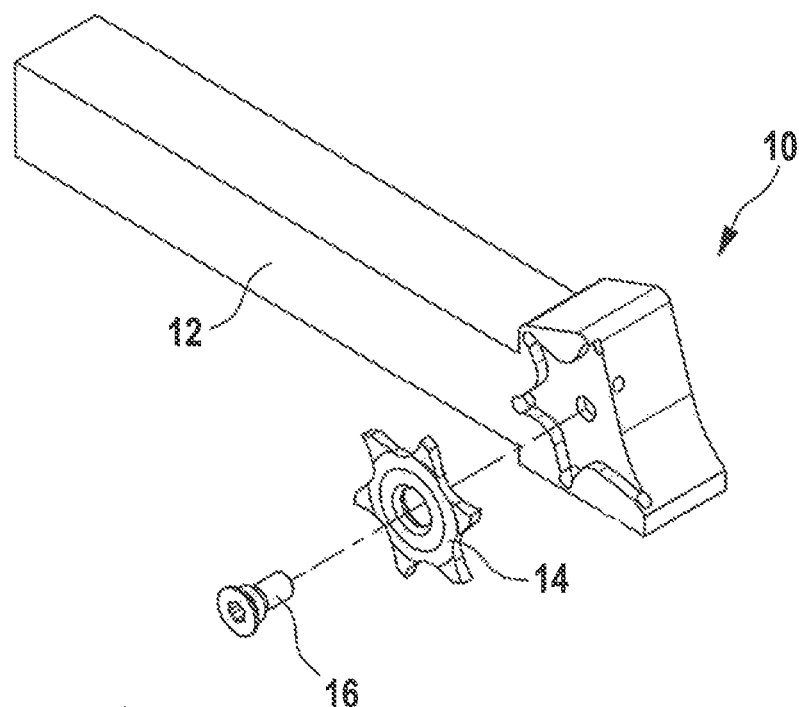
FIG. 2 shows an exploded representation of the embodiment of the tool shown in FIG. 1.
Figure 3:
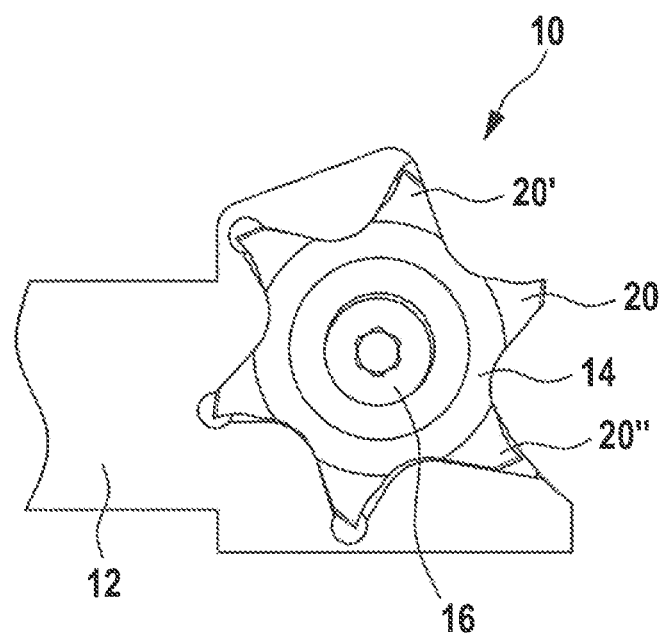
FIG. 3 shows a frontal top view of the embodiment of the tool shown in FIG. 1.
Figure 4A:
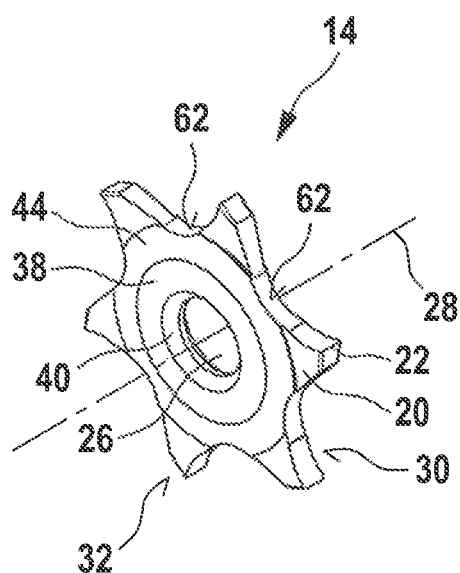
FIG. 4A shows a perspective view of an embodiment of the herein presented cutting insert; from a second side.
Figure 4B:
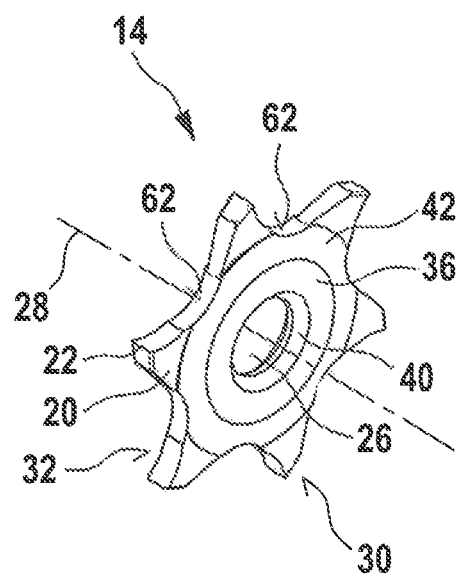
FIG. 4B shows a perspective view of an embodiment of the herein presented cutting insert; from a first side.

FIG. 1-3 show an illustrative embodiment of the herein presented tool in a perspective view; an exploded representation and a frontal top view. The tool is therein denoted in its entirety by the reference numeral 10.

The tool 10 has a holder 12, which is frequently also referred to as a tool holder 12, and a cutting insert 14. The cutting insert 14 is fastened with the aid of a fastening element 16 detachably to the holder 12. The fastening element 16 is preferably in the form of a binding screw, which engages in a corresponding thread 18 (see FIGS. 7 and 8) provided on the holder 12.

The holder 12 is preferably made of steel. The cutting insert 14 is preferably made of carbide.

An illustrative embodiment of a cutting insert 14 is shown in FIGS. 4A, 4B, 5A, 5B and 6 in a perspective view, a top view and a sectional view. The cutting insert 14 is in the form of an indexable cutting insert comprising six cutting heads 20 of same type. The cutting heads 20 are arranged on the periphery of the cutting insert 14. Preferably, the cutting inserts 20 are arranged evenly distributed in the peripheral direction. In the here shown illustrative embodiment of the cutting insert 14 comprising six cutting heads 20, an angle of 60° between two adjacent cutting heads 20 is thus obtained. It is obvious, however, that the cutting insert 14 can in principle also have fewer than six cutting heads, but also more than six cutting heads. Similarly, though it is preferred, it is not absolutely necessary for the cutting heads 20 to be arranged distributed at regular spacings over the periphery of the cutting insert 14.

Each cutting head 20 of the cutting insert 14 preferably has at least one cutting edge 22. The cutting edges 22 are preferably all of same design, so that it is immaterial which of the cutting heads 20 is employed. The cutting edges 22 are preferably designed as rectilinearly running cutting edges. They run parallel to one another and form in the radial direction of the cutting insert 14 respectively the outermost points of the cutting insert 14. The cutting edges 22 of the cutting heads 20 thus preferably lie on a common, imaginary circle or circular cylinder.

The cutting heads 20 are thus arranged substantially in a star shape on a main body 24 of the cutting insert 14. The cutting insert 14 has in its center a bore 26. This bore 26 runs along a bore axis 28 and fully penetrates the main body 24. The bore thus extends from a first side 30 to a second side 32 of the cutting insert 14. In the here shown illustrative embodiment, the cutting insert 14 rests with its first side 30 on the holder 12.

The cutting insert 14 is preferably rotationally symmetric to the bore axis 28. In addition, the cutting insert 14 is preferably also mirror-symmetric to a center plane which runs perpendicular to the bore axis 28 and divides the cutting insert 14 into two equally sized halves. The cutting edges 22 preferably run parallel to the bore axis 28.

The bore 26 has contiguous to the first side 30 of the cutting insert 14 preferably a countersink 34, which runs symmetrically to the bore axis 28 and preferably fully surrounds the bore 26. This countersink 34 serves as an application surface for the conical screw head of the binding screw 16. The binding screw 16 can in this way preferably be sunk fully in the bore 26, so that the end face of the screw head of the clamping screw 16 terminates flush with the first side 30 of the cutting insert 14.

Contiguous to the countersink 34, the cutting insert 14 further has a support surface 36. This support surface 36 is here referred to as the first support surface. Due to the preferred mirror symmetry of the cutting insert 14, there exists on the opposite second side 32 a corresponding second support surface 38, which lies opposite the first support surface 36 and runs parallel thereto. Correspondingly to the countersink 34, on the second side 32 of the cutting insert 14 there is also provided a countersink 40, which extends between the bore 60 and the second support surface 38. Both countersinks 34, 40 preferably have a conical shape and run symmetrically to the bore axis 28.

Both support surfaces 36, 38 serve for the support of the cutting insert 14 on the tool holder 12. Due to the preferred mirror symmetry of the cutting insert 14, the cutting insert 14 can be used both as the "left" and the "right" cutting insert. It can thus bear either with the first support surface 36 against the holder 12 or with the second support surface 38 against the holder 12. If it bears with the second support surface 38 against the holder, then the latter is designed, however, inversely to the holder 12 shown in FIGS. 1-3 and 7-8. It is obvious that the mirror-symmetrical design of the cutting insert 14 is advantageous, though not absolutely necessary.

Both support surfaces 36, 38 are preferably of circular design and run orthogonally and symmetrically to the bore axis 28.

The support surface 36 is preferably fully surrounded by a recess 42. This likewise has a substantially circular form. Obviously, in a mirror-symmetrical embodiment of the cutting insert 14, as is the case according to the present illustrative embodiment, a corresponding recess 44 is also provided on the second side 32 of the cutting insert 14.

Figure 6:
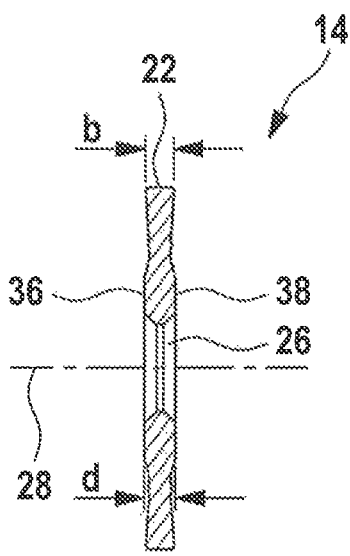
FIG. 6 shows a sectional view of the cutting insert shown in FIGS. 4A and 4B.

As is evident in particular from the sectional view represented in FIG. 6, the distance d, measured parallel to the bore axis 28, between the two support surfaces 36, 38 is roughly equal in size to the width of the cutting edges 22, measured parallel thereto. The lateral tool flanks respectively adjoining the two ends of the cutting edges 22 on the first side 30 and the second side 32 are inclined, however, such that the cutting heads 20 respectively taper with decreasing distance to the bore axis 20. The cutting edges 22 therefore form the respectively widest part of the cutting heads 20, wherein by "width" is here understood that dimension of the cutting insert 14 which is measured parallel to the bore axis 28. Provided that the distance between the two support surfaces 36, 38 is roughly or exactly equal in size to the width of the cutting edges 22, the cutting edges 22 thus in total constitute the respectively widest points of the cutting insert 14 in the cutting edge zone. By the cutting edge zone are here understood all regions of the cutting insert 14 which are arranged radially further out than the first and second support surfaces 36, 38.

Figure 5A:
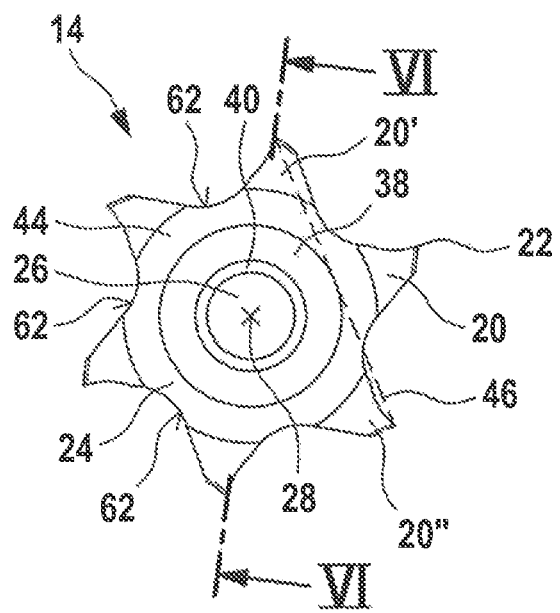
FIG. 5A shows a lateral top view of the cutting insert shown in FIGS. 4A and 4B, from the second side.
Figure 5B:
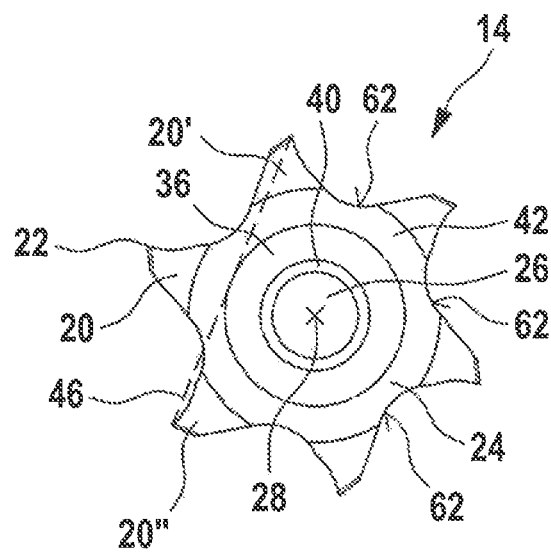
FIG. 5B shows a lateral top view of the cutting insert shown in FIGS. 4A and 4B, from the first side.

In FIGS. 5A and 5B, a further feature of the cutting insert 14 is apparent. By way of example, three consecutive cutting heads are therein denoted by the same reference numerals 20', 20 and 20". For differentiation purposes, the cutting head 20' is hereinafter referred to as the first cutting head. The cutting head 20 which directly follows the first cutting head 20' in the peripheral direction is referred to as the second cutting head. The cutting head 20" which directly follows the second cutting head 20 in the peripheral direction is referred to as the third cutting head. In FIGS. 5A and 5B, an imaginary straight connecting line 46 is illustrated in dashed representation. This connecting line 46 connects the first cutting head 20' to the third cutting head 20". The second cutting head 20 situated to the right of this connecting line 46 is, for instance, that cutting head of the cutting insert 14 which is respectively in use.

The cutting insert 14 is designed such that the connecting line 46 intersects neither the bore 26 nor the first or second support surface 36, 38. Due to this fact, the plunge depth which can be realized with the cutting insert 14 is maximized. If a workpiece is recessed with the cutting head 20, it is in fact possible for the cutting insert 14 to intrude into the workpiece up to the connecting line 46, without this resulting in collisions between the workpiece and undesirable parts of the cutting insert 14.

In the here shown illustrative embodiment, the support surfaces 36, 38 tangentially adjoin the connecting line 46. This does not necessarily have to be the case. The support surfaces 36, 38 can also be designed smaller, i.e. have a smaller maximum diameter. In the case of a tangential touching of the connecting line 46, the support surfaces 36, 38 are designed, however, maximally large, wherein the maximum plunge depth of the cutting insert 14 is not thereby diminished, however, since the connecting line 46 is not crossed or the connecting line 46 does not intersect (but only tangentially touches) the support surfaces 36, 38.

Obviously, the relationship with respect to the connecting line 46, which relationship is described above by way of example on the basis of the three consecutive cutting heads 20', 20 and 20", preferably applies to all cutting heads 20 of the cutting insert 14, due to the preferred rotational symmetry of the cutting insert 14.

Figure 7:
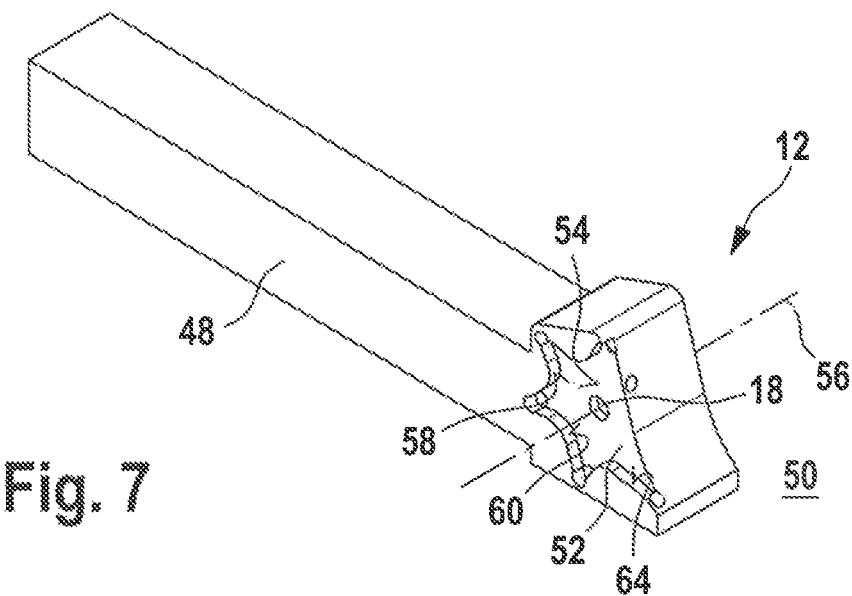
FIG. 7 shows a perspective view of an embodiment of the tool holder of the herein presented tool.
Figure 8:
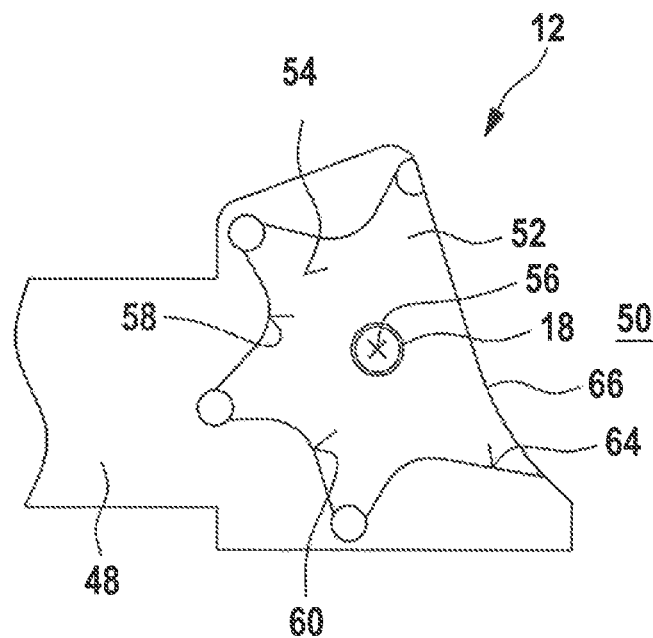
FIG. 8 shows a frontal top view of the tool holder shown in FIG. 7.

FIGS. 7 and 8 show the tool holder 12. The tool holder 12, which is here generally more commonly referred to as the holder 12, has a shank 48, with the aid of which the holder 12 is clamped onto a machine tool. In the region of its front end 50, the holder 12 has a recess 52, which serves as a receiving fixture for two inserts. This recess 52 is substantially matched to the shape of the cutting insert 14. It has a preferably flat face 54, which runs orthogonal to the thread axis 56 of the thread 18 in which the clamping screw 16 engages. On this face 54 of the holder 12, the cutting insert 14 rests with its first support surface 36.

In addition, the cutting insert receiving fixture 52 of the holder has two convexly shaped holder contact surfaces 58, 60. The holder contact surfaces 58, 60 run orthogonal to the face 54 or parallel to the thread axis 56. The cutting insert 14, in the mounted state of the tool, bears against these holder contact surfaces 58, 60 with respectively one of the cutting insert contact surfaces 62 arranged distributed over the periphery of the cutting insert 14. The cutting insert contact surfaces 62 are respectively peripherally arranged between two adjacent cutting heads 20 of the cutting insert 14. They run perpendicular to the support surfaces 36, 38 or parallel to the bore axis 28. The cutting insert contact surfaces 62 have a concave shape. The holder contact surfaces 58, 60 are preferably more strongly curved than the cutting insert contact surfaces 62. A type of linear contact between the holder contact surfaces 58, 60 and the cutting insert contact surfaces 62 is hereby produced.

The distance between the cutting insert contact surfaces 62 and the bore axis 28 of the cutting insert 14 is somewhat greater, however, than the distance between holder contact surfaces 58, 60 and the thread axis 56. As the screw 16 is screwed in, the cutting insert 14 is therefore automatically pressed against the holder contact surfaces 58, 60. A stable and mechanically defined insert seat is hereby produced.

It should be noted that the cutting insert receiving fixture 52 further has yet another contact surface 64, which likewise runs perpendicular to the face 54 or parallel to the thread axis 56. This contact surface is preferably designed as a flat, uncurved surface. In the mounted state of the tool, the cutting insert 14 rests only partially on this contact surface 64. Via this surface 64, the generated torque is absorbed and transmitted from the cutting insert 14 into the holder 12.

The holder 12 further has in the region of its front-face end 50 a front edge 66, which forms the front end of the cutting insert receiving fixture 52. As can be seen in particular in FIG. 3, in the mounted state of the tool 10 only the cutting edge 22 of the cutting head 20 currently in use protrudes over this front edge 66, whereas the cutting edges of all other cutting heads (for example 20' and 20") are arranged in the holder 12 or within the cutting insert receiving fixture 52 and are hence protected. Damage to the other cutting edges 22, which are not in use, can in this way be effectively prevented.

What is claimed is:

1. A cutting insert for a tool for machining a workpiece, comprising main body having a first side, an opposite second side and a bore running along a bore axis, which bore penetrates the main body and extends from the first side to the second side, and comprising at least five cutting heads arranged distributed on a periphery of the cutting insert and protrude from the main body in a star-shaped manner, wherein the cutting heads are integrally formed with the main body, wherein each of the at least five cutting heads comprises a cutting edge, which runs transversely to the first side and the second side and extends between the first side and the second side, wherein the at least five cutting heads comprise a first cutting head, a second cutting head, which in a peripheral direction directly follows the first cutting head, and a third cutting head, which in the peripheral direction directly follows the second cutting head, and wherein the cutting insert has a first support surface arranged on the first side, which first support surface runs orthogonal to the bore axis and at least partially surrounds the bore, wherein the cutting insert is rotationally symmetric to the bore axis and mirror-symmetric to a center plane which runs perpendicular to the bore axis and divides the cutting insert into two equally sized halves, wherein, viewed in a top view along the bore axis, an imaginary straight connecting line between the cutting edge of the first cutting head and the cutting edge of the third cutting head intersects neither the bore nor the first support surface.

2. The cutting insert as claimed in claim 1, wherein the bore has contiguous to the first side a countersink, wherein the first support surface directly adjoins the countersink.

3. The cutting insert as claimed in claim 1, wherein the first support surface is annular.

4. The cutting insert as claimed in claim 3, wherein the imaginary straight connecting line between the cutting edge of the first cutting head and the cutting edge of the third cutting head, viewed in the top view along the bore axis, tangentially touches the first support surface.

5. The cutting insert as claimed in claim 1, wherein the first support surface is surrounded by a recess which extends on the first side between the first support surface and the cutting heads.

6. The cutting insert as claimed in claim 1, wherein the at least five cutting heads comprise at least six cutting heads.

7. The cutting insert as claimed in claim 1, wherein the cutting insert further has a second support surface arranged on the second side, which second support surface runs orthogonal to the bore axis, at least partially surrounds the bore and lies opposite the first support surface.

8. The cutting insert as claimed in claim 7, wherein the first support surface has a first distance from the second support surface, wherein the cutting edges respectively have a width measured parallel to the bore axis, and wherein $0.9\,b \leq d \leq 1.1\,b$, where $b$ is the width of the cutting edges and $d$ is the first distance.

9. A tool for machining a workpiece, comprising:
a cutting insert comprising a first side, an opposite second side and a bore running along a bore axis, which bore penetrates the cutting insert and extends from the first side to the second side, and comprising at least three cutting heads arranged distributed on a periphery of the cutting insert, wherein each of the at least three cutting heads comprises a cutting edge, which runs transversely to the first side and the second side and extends between the first side and the second side, wherein the at least three cutting heads comprise a first cutting head, a second cutting head, which in a peripheral direction directly follows the first cutting head, and a third cutting head, which in the peripheral direction directly follows the second cutting head, and wherein the cutting insert has a first support surface arranged on the first side, which first support surface runs orthogonal to the bore axis and at least partially surrounds the bore, wherein the cutting insert is rotationally symmetric to the bore axis and mirror-symmetric to a center plane which runs perpendicular to the bore axis and divides the cutting insert into two equally sized halves, wherein, viewed in a top view along the bore axis, an imaginary straight connecting line between the cutting edge of the first cutting head and the cutting edge of the third cutting head intersects neither the bore nor the first support surface, wherein the first support surface is annular;
a holder; and
a fastening element which fastens the cutting insert to the holder.

10. The tool as claimed in claim 9, wherein the bore has contiguous to the first side a countersink, wherein the first support surface directly adjoins the countersink.

11. The tool as claimed in claim 9, wherein the imaginary straight connecting line between the cutting edge of the first cutting head and the cutting edge of the third cutting head, viewed in the top view along the bore axis, tangentially touches the first support surface.

12. The tool as claimed in claim 9, wherein the first support surface is surrounded by a recess which extends on the first side between the first support surface and the cutting heads.

13. The tool as claimed in claim 9, wherein the fastening element comprises a screw, and wherein the holder has a thread, which runs along a thread axis and in which the screw engages, and wherein the holder has a first holder support surface, which runs orthogonal to the thread axis and on which, in a mounted state of the tool, the first support surface of the cutting insert rests.

14. The tool as claimed in claim 13, wherein the holder has two mutually spaced holder contact surfaces, against which the cutting insert, in the mounted state of the tool, bears peripherally with two corresponding cutting insert contact surfaces, which are arranged between respectively two adjacent cutting heads of the at least three cutting heads, wherein the holder contact surfaces run parallel to the thread axis, and wherein the cutting insert contact surfaces run parallel to the bore axis.

15. The tool as claimed in claim 14, wherein the holder contact surfaces are convexly shaped and the cutting insert contact surfaces are concavely shaped, and wherein a radius of curvature of the holder contact surfaces is smaller than a radius of curvature of the cutting insert contact surfaces.

16. The tool as claimed in claim 14, wherein a distance between the holder contact surfaces and the thread axis is less than a distance between the cutting insert contact surfaces and the bore axis.

17. The tool as claimed in claim 15, wherein a distance between the holder contact surfaces and the thread axis is less than a distance between the cutting insert contact surfaces and the bore axis.

18. The tool as claimed in claim 9, wherein the holder comprises at a front-face end a front edge, and wherein, in a mounted state of the tool, the cutting edge of only one of the at least three cutting heads protrudes from the holder beyond the front edge.

19. A tool for machining a workpiece, comprising:

a cutting insert comprising a first side, an opposite second side and a bore running along a bore axis, which bore penetrates the cutting insert and extends from the first side to the second side, and comprising at least three cutting heads arranged distributed on a periphery of the cutting insert, wherein each of the at least three cutting heads comprises a cutting edge, which runs transversely to the first side and the second side and extends between the first side and the second side, wherein the at least three cutting heads comprise a first cutting head, a second cutting head, which in a peripheral direction directly follows the first cutting head, and a third cutting head, which in the peripheral direction directly follows the second cutting head, and wherein the cutting insert has a first support surface arranged on the first side, which first support surface runs orthogonal to the bore axis and at least partially surrounds the bore, wherein the cutting insert is rotationally symmetric to the bore axis and mirror-symmetric to a center plane which runs perpendicular to the bore axis and divides the cutting insert into two equally sized halves, wherein, viewed in a top view along the bore axis, an imaginary straight connecting line between the cutting edge of the first cutting head and the cutting edge of the third cutting head intersects neither the bore nor the first support surface;

a holder; and a fastening element which fastens the cutting insert to the holder, wherein the fastening element comprises a screw, and wherein the holder has a thread, which runs along a thread axis and in which the screw engages, and wherein the holder has a first holder support surface, which runs orthogonal to the thread axis and on which, in a mounted state of the tool, the first support surface of the cutting insert rests.

* * * * *